(12) United States Patent
Hemans et al.

(10) Patent No.: US 11,300,051 B2
(45) Date of Patent: Apr. 12, 2022

(54) ENGINE SYSTEMS WITH LOAD COMPRESSOR THAT PROVIDES COOLING AIR

(71) Applicant: HONEYWELL INTERNATIONAL INC., Morris Plains, NJ (US)

(72) Inventors: Nicholas Hemans, Phoenix, AZ (US); Vanessa Dwinell, Phoenix, AZ (US); Christopher Zollars, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 256 days.

(21) Appl. No.: 16/265,260

(22) Filed: Feb. 1, 2019

(65) Prior Publication Data
US 2020/0248624 A1 Aug. 6, 2020

(51) Int. Cl.
*F02C 7/18* (2006.01)
*F23R 3/00* (2006.01)
(Continued)

(52) U.S. Cl.
CPC .............. *F02C 7/18* (2013.01); *F01D 25/125* (2013.01); *F02C 6/06* (2013.01); *F02C 7/32* (2013.01);
(Continued)

(58) Field of Classification Search
CPC ...... F02C 7/18; F02C 6/04; F02C 6/06; F02C 6/10; F02C 9/20; F02C 6/08; F02C 3/10; F01D 25/125; F01D 25/22; F01D 9/026; F01D 25/081–087; F01D 5/081–087; F05D 2220/50; F05D 2260/201; F05D 2260/204; F05D 2260/2212; F05D 2260/2214; F05D 2240/63; F05D 2260/205; F05D 2260/221–22141; F05D 2260/231; F05D 2260/232; F23R 2900/03041–03045; F23R 2900/03342;
(Continued)

(56) References Cited

U.S. PATENT DOCUMENTS 4,550,563 A * 11/1985 Marchand ................. F02C 3/26
110/264
4,809,497 A * 3/1989 Schuh ..................... F02C 3/085
417/280

(Continued)

FOREIGN PATENT DOCUMENTS

EP 1612371 A1 1/2006

*Primary Examiner* — Stephanie Sebasco Cheng
(74) *Attorney, Agent, or Firm* — Lorenz & Kopf, LLP

(57) ABSTRACT

An engine system includes a gas generator section and a load compressor. The gas generator section includes a core compressor, a combustion assembly, and a turbine. The core compressor receives and compresses a first flow of air as first compressed air. The combustion assembly receives the first compressed air from the compressor, mixes the first compressed air with fuel, and combusts the first compressed air and fuel mixture to result in combustion gases. The turbine receives the combustion gases from the combustion assembly and extracts energy from the combustion gases. The load compressor is driven by the turbine, and it is further configured to receive and compress a second flow of air as second compressed air. At least a portion of the second compressed air is directed to the gas generator section as cooling air.

9 Claims, 3 Drawing Sheets

(51) Int. Cl.
*F02C 6/06* (2006.01)
*F02C 7/32* (2006.01)
*F01D 25/12* (2006.01)

(52) U.S. Cl.
CPC .......... *F23R 3/002* (2013.01); *F05D 2220/50* (2013.01); *F05D 2260/232* (2013.01)

(58) Field of Classification Search
CPC ..... F16C 32/064; F16C 32/0614–0625; B64D 2013/0611; B64D 2033/0213
See application file for complete search history.

(56) References Cited

U.S. PATENT DOCUMENTS

| | | | |
|---|---|---|---|
| 5,274,997 A * | 1/1994 | Inoue | F02C 7/105 165/8 |
| 6,101,806 A * | 8/2000 | Chen | F02C 6/16 60/785 |
| 6,152,978 A | 11/2000 | Lundquist | |
| 6,578,351 B1 | 6/2003 | Modafferi | |
| 7,093,447 B2 | 8/2006 | Thompson et al. | |
| 7,097,411 B2 | 8/2006 | Smoke et al. | |
| 7,152,410 B2 | 12/2006 | Sheoran et al. | |
| 7,231,767 B2 | 6/2007 | Whiting | |
| 7,251,942 B2 * | 8/2007 | Dittmar | F02C 3/09 60/788 |
| 7,263,834 B2 | 9/2007 | Reiter et al. | |
| 7,669,425 B2 | 3/2010 | Liang | |
| 7,913,488 B2 | 3/2011 | Schick et al. | |
| 8,292,576 B2 | 10/2012 | Frost et al. | |
| 9,644,538 B2 | 5/2017 | Dionne | |
| 10,167,783 B2 * | 1/2019 | Collopy | F02C 9/20 |
| 10,247,017 B2 * | 4/2019 | Miller | F01D 9/04 |
| 10,428,826 B2 * | 10/2019 | Stein | F04D 29/0513 |
| 10,655,859 B2 * | 5/2020 | Smoke | F01D 9/023 |
| 10,774,874 B2 * | 9/2020 | Binion | F16C 17/12 |
| 2004/0088995 A1 | 5/2004 | Reissig | |
| 2009/0260342 A1 * | 10/2009 | Ishiguro | F02C 1/04 60/39.511 |
| 2014/0290252 A1 * | 10/2014 | Uemura | F02C 3/08 60/726 |
| 2016/0153365 A1 * | 6/2016 | Fletcher | F02C 9/18 60/773 |
| 2016/0341067 A1 | 11/2016 | Benyahia et al. | |
| 2017/0037776 A1 | 2/2017 | Jones et al. | |
| 2017/0159565 A1 * | 6/2017 | Evulet | F02K 1/002 |
| 2017/0167388 A1 | 6/2017 | Merry et al. | |
| 2017/0184027 A1 * | 6/2017 | Moniz | F02C 7/32 |
| 2019/0145623 A1 * | 5/2019 | Fukumoto | F01D 25/12 60/752 |
| 2020/0141327 A1 * | 5/2020 | Redford | F02C 3/04 |
| 2020/0216180 A1 * | 7/2020 | Szillat | B64D 41/00 |

* cited by examiner

ENGINE SYSTEMS WITH LOAD COMPRESSOR THAT PROVIDES COOLING AIR

TECHNICAL FIELD

The exemplary embodiments described herein generally relate to engine systems, and more specifically, to auxiliary power units (APUs) and the cooling of APU hot section components.

BACKGROUND

Engine systems are used on aircraft for various purposes, including propulsion in the case of aircraft main engines. Additionally, engine systems in the form of auxiliary power units (APUs) may be used to drive various other aircraft components such as, for example, generators, compressors, and pumps to thereby supply electrical, pneumatic, hydraulic power, and/or other power needs when the aircraft is on the ground and during flight.

Generally, an APU is a gas turbine engine that includes one or more compressors, combustor, and one or more power turbines. During operation of the APU, the compressors draw in ambient air, compresses it, and supplies the compressed air to the combustor and/or to other loads. The combustor receives the compressed air from the compressor, mixes it with fuel, and ignites the mixture to result in high energy combustion gases that drive the downstream power turbine. The power turbine may be used to drive to the compressor(s) and/or other components, such as a generator to supply electrical power. Further, the APU may have a load compressor driven by the power extracted by the one or more turbines to provide compressed air to an environmental control system (ECS) of the aircraft and/or to satisfy other pneumatic or electrical requirements. In some cases, the APU may operate at relatively high temperature, thereby presenting potential challenges.

Accordingly, it is desirable to provide engine systems, particularly APUs with load compressors, that have improved efficiency and/or cooling characteristics. Furthermore, other desirable features and characteristics of the present invention will become apparent from the subsequent detailed description of the invention and the appended claims, taken in conjunction with the accompanying drawings and background of the invention.

BRIEF SUMMARY

In one embodiment, an engine system, includes a gas generator section and a load compressor. The gas generator section includes a core compressor, a combustion assembly, and a turbine. The core compressor is configured to receive and compress a first flow of air as first compressed air. The combustion assembly is fluidly coupled to receive the first compressed air from the compressor, mix the first compressed air with fuel, and combust the first compressed air and fuel mixture to result in combustion gases. The turbine is fluidly coupled to receive the combustion gases from the combustion assembly and is configured to extract energy from the combustion gases. The load compressor is configured to be driven by the turbine, and it is further configured to receive and compress a second flow of air as second compressed air. At least a portion of the second compressed air is directed to the gas generator section as cooling air.

In another embodiment, an auxiliary power unit (APU) system includes a gas generator section and a load compressor. The gas generator section includes a core compressor, a combustion assembly, and a turbine. The core compressor is configured to receive and compress a first flow of air as first compressed air. The combustion assembly is fluidly coupled to receive the first compressed air from the compressor, mix the first compressed air with fuel, and combust the first compressed air and fuel mixture to result in combustion gases. The turbine is rotationally mounted via one or more air bearings. The turbine is fluidly coupled to receive the combustion gases from the combustion assembly and is configured to extract energy from the combustion gases. The load compressor is configured to be driven by the turbine, and it is further configured to receive and compress a second flow of air as second compressed air. At least a portion of the second compressed air is directed as cooling air to the combustion assembly, the one or more air bearings, and the turbine.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
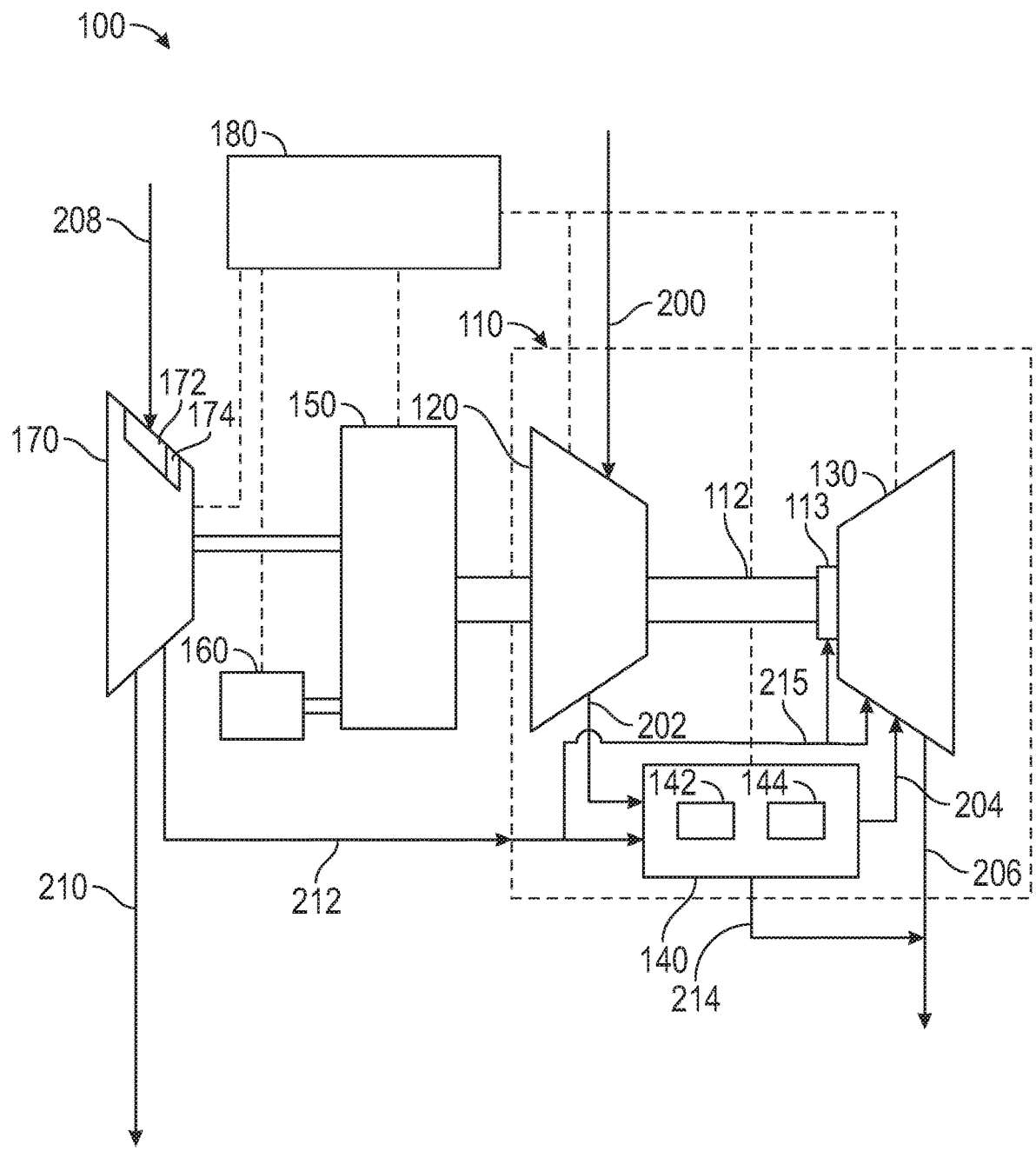
FIGS. 1 and 2 are schematic views of an engine system in the form of an auxiliary power unit (APU) in accordance with an exemplary embodiment.

FIG. 1 is a schematic view of an engine system in the form of an auxiliary power unit (APU) 100 in accordance with an exemplary embodiment. In one embodiment, the APU 100 includes at least a gas generator section 110 with one or more core compressors 120 (one of which is shown), one or more turbines 130 (one of which is shown), and a combustion assembly 140 having a combustor 142 and combustor scroll 144. The APU 100 further includes a gear arrangement 150, a starter generator 160, a load compressor 170, and a controller 180. In one example, the APU 100 is generally housed within a single containment housing, although other arrangements may be provided. Although schematically shown as generally singular components, one or more of the APU components may have multiple stages or alternate arrangements.

During operation of the APU 100, a first flow of air (indicated by arrow 200) enters the gas generator section 110 at the core compressor 120. The compressor 120 increases the pressure of the air and directs the compressed air (indicated by arrow 202) into the combustion assembly 140. In the combustion assembly 140, the compressed air is mixed with fuel from a fuel source (not shown) and ignited to produce high energy combustion gases (indicated by arrow 204) directed into the turbine 130. The turbine 130 extracts energy from the combustion gases and subsequently exhausts the combustion gases out of the aircraft via an exhaust path (indicated by arrow 206). The turbine 130 and compressor 120 are coupled together by an engine shaft 112 such that the turbine 130 may drive the compressor 120 via the engine shaft 112. Although only one engine shaft 112 is depicted, the APU 100 may include multi-spool arrangements.

The engine shaft 112 may be rotationally mounted using one or more air bearings 113 and, at least in the depicted embodiment, is additionally coupled to the gear arrangement 150. The gear arrangement 150, when included, receives and distributes the power extracted by the turbine 130. The starter generator 160 and the load compressor 170 are coupled to the gear arrangement 150 to receive the power extracted by the turbine 130.

The starter generator 160 may transform the rotary power from the gear arrangement 150 into electrical power. The electrical power may be provided to the aircraft power distribution system for use by other systems of the aircraft. In some embodiments, the starter generator 160 may also be used to drive the turbine 130 via the gear arrangement 150 and engine shaft 112 when starting the APU 100.

As introduced above, the load compressor 170 is coupled to be driven via the gear arrangement 150. In some embodiments, the gear arrangement may be omitted, and the turbine 130 may drive the load compressor 170 via a single shaft. Further in some embodiments, the load compressor 170 may be electrically driven.

Regardless of how the load compressor 170 is driven, during operation of the APU 100, the load compressor 170 receives and compresses a second flow of air (indicated by arrow 208). In one example, the load compressor 170 may include an impeller with a series of blades extending into a flow path bounded by a shroud and extending between an inlet and outlet. As the impeller rotates, air is drawn into the load compressor 170 and compressed. A number of inlet guide vanes (IGVs) 172 (schematically shown) are disposed adjacent to or at the inlet of the load compressor 170 and are movable, via one or more inlet guide vane actuators 174 (schematically shown), to a plurality of positions. The inlet guide vane actuators 174, and thus the positions of the inlet guide vanes 172, are controlled via inlet guide vane control logic or schedules disposed within the controller 180. In further embodiments, the controller 180 may control or meter the amount of flow from the load compressor 170 by controlling the compressor speed. Though not depicted in FIG. 1, it will be appreciated that the load compressor 170 may also include a diffuser and/or air collection scroll that receives and distributes the compressed air.

The compressed air from the load compressor 170 may be used for a number of purposes. For example, portions of the compressed air (indicated by arrow 210) may be supplied to various pneumatic loads, such as the aircraft environmental control system (ECS), the main engine turbine starter motor, and/or for various other pneumatic aircraft functions. In particular, the ECS may supply compressed air for temperature control of the aircraft cabin and electronic equipment within the aircraft.

Figure 2:
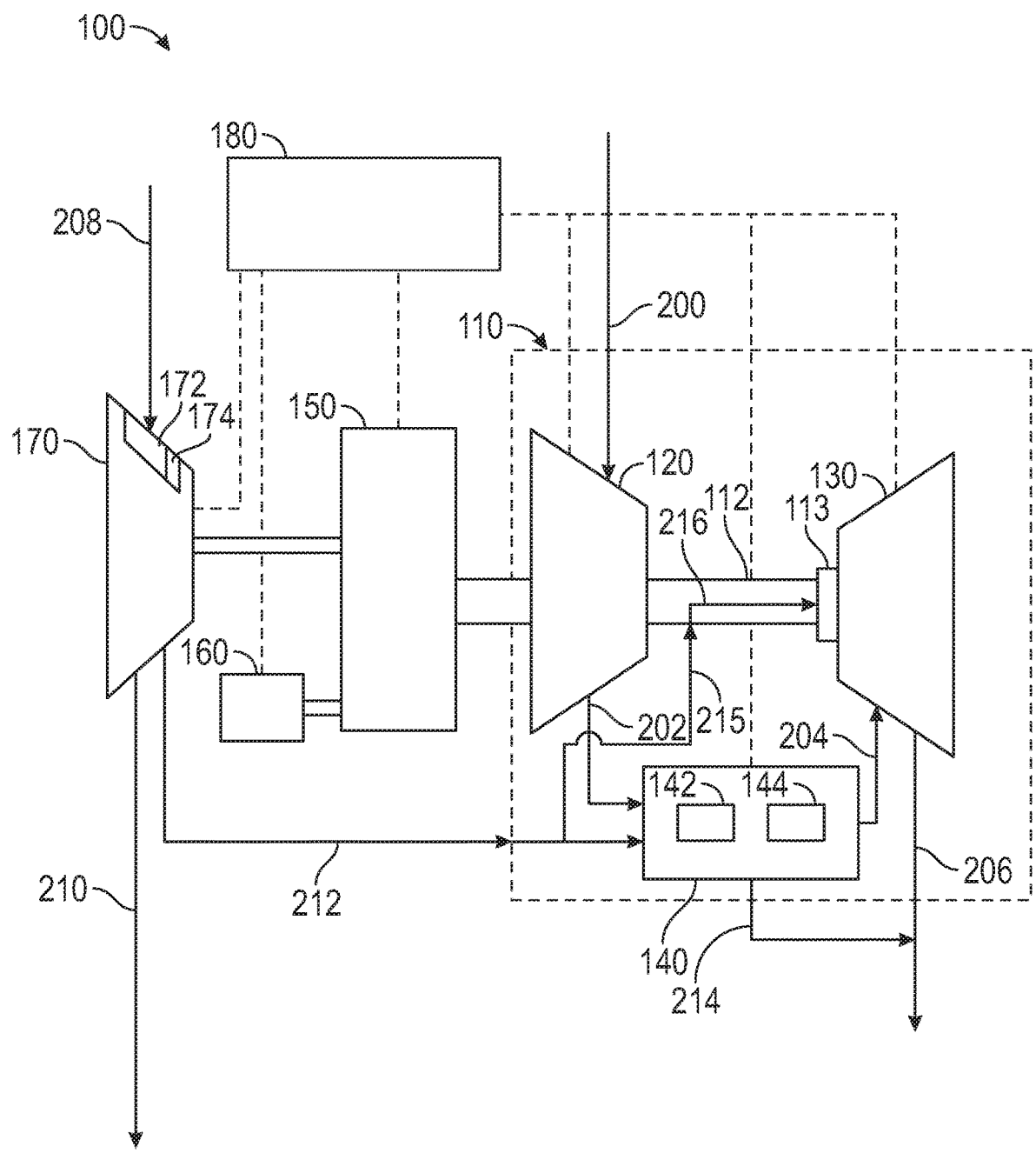

As FIG. 1 also depicts, a portion of the compressed air may also be supplied, via one or more ducts 212, to various cooling loads, such as one or more components of the gas generator section 110. In particular, the compressed air may be used to cool the combustor 142 and/or combustor scroll 144, to cool the one or more air bearings 113, and/or to cool various components (e.g., stator vanes, turbine shrouds, and inter-turbine ducts) within the turbine 130. After cooling, the air may be directed into the exhaust path 206. The compressed air may be supplied to the one or more air bearings 113 and/or to cool various components within the turbine 130 directly via suitable ducting 215 or, as FIG. 2 depicts, the compressed air may first be supplied via suitable ducting 215 to the shaft 112. In these embodiments, the shaft 112 includes an internal flow passage 216 that directs compressed air to the one or more air bearings 113 and/or the various components within the turbine 130.

For completeness, and with reference now to FIG. 3, a cross-section view of one particular embodiment of the combustion assembly 140 is depicted and will be described. As shown, one or both of the combustor 142 and scroll 144 may be housed within a double walled housing 300. The double walled housing 300 may also be considered a single walled housing with a plenum wall that at least partially surrounds the housing. In any event, the housing 300 includes an outer wall 310 and an inner wall 320. The compressed air enters the housing 300 at an inlet plenum 330, which is then directed into the combustor 142, as generally indicated by arrow 332.

The combustor 142 includes a combustor dome 340, a fuel injector 342, and an igniter 344. The combustor dome 340 is mounted within the inner wall 320 of the housing and generally has a cylindrical (or can) shape to define a combustion chamber 346 within the interior of the dome 340, a plurality of air inlets 348 through the combustor dome 340, and a combustion outlet 350 at one end of the combustor dome 340. The fuel injector 342 and igniter 344 are mounted to the combustor dome 340.

The air inlets 348 are disposed around the sides of the combustor dome 340 to direct the air from the inlet plenum 330 of the combustor 142 into the combustion chamber 346. Based on commands from the controller 180 (FIG. 1), the fuel injector 342 introduces fuel into the combustion chamber 346 to mix with the air, and the resulting mixture is ignited by the igniter 344 to produce relatively high-energy combustion gases. Although depicted as a can-type combustor, the combustor 142 may be implemented as any suitable type combustor, such as various multi-can combustors, can annular combustors, reverse-flow combustors, through-flow combustors, and slinger combustors.

Generally, the scroll 144 is a transition scroll that receives, redirects, and provides the combustion gases to the turbine 130 in a suitable condition. Accordingly, the transition scroll 144 distributes the combustor gases from a simple cylindrical flow channel from the combustor 142 into an axial annular flow channel for receipt by the turbine 130.

Figure 3:
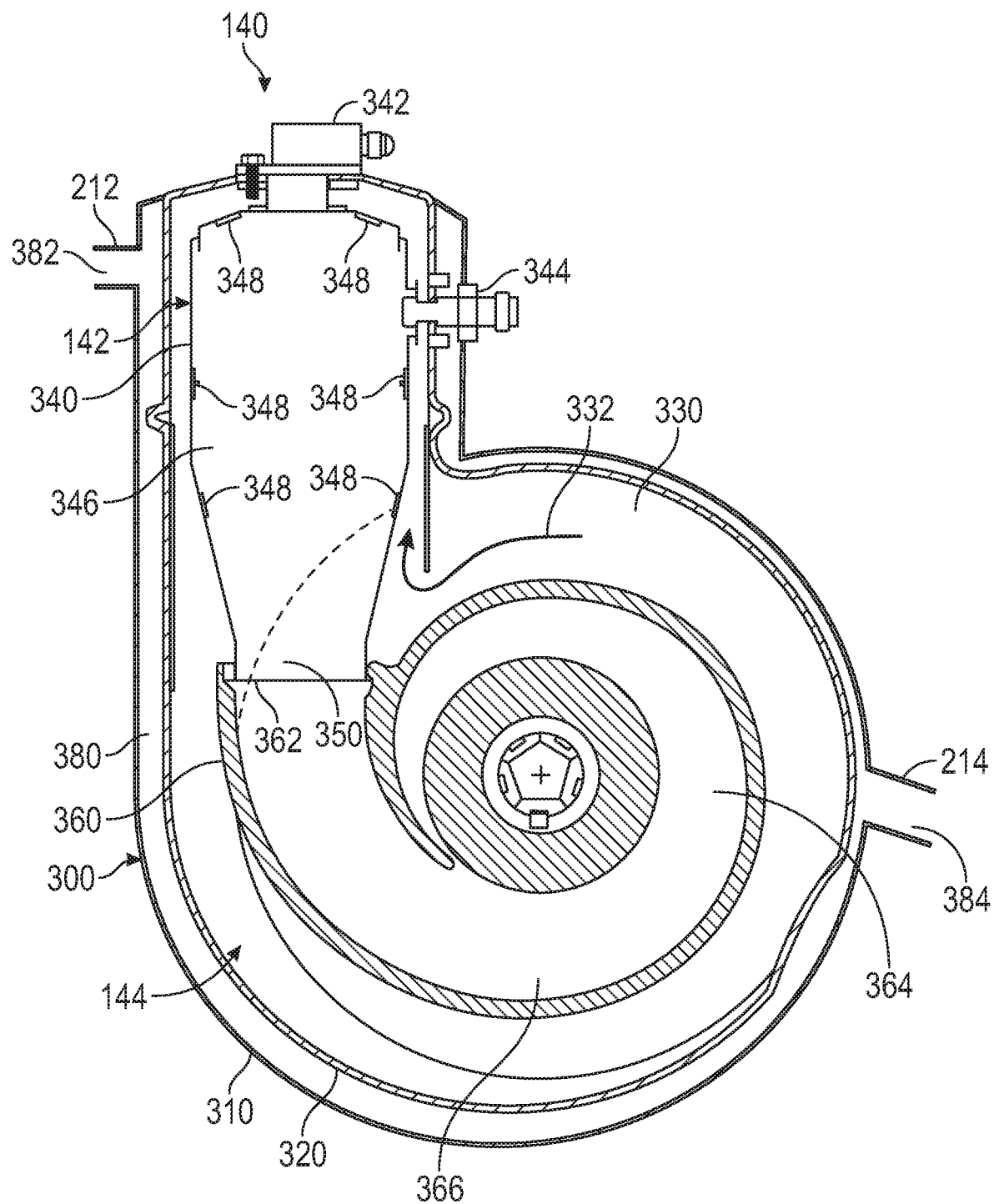
FIG. 3 is a partial cross-sectional view of a combustion assembly that may be incorporated into the APU of FIGS. 1 and 2 in accordance with an exemplary embodiment.

The scroll 144 is formed by a generally coiled or spiral wall 360 that defines an inlet 362 at a first end, an outlet 364 at a second end, and a flow path 366 extending between the inlet 362 and an outlet 364 that extends along the flow path 366 in the view of FIG. 3. The scroll inlet 362 is fluidly coupled to the combustion outlet 350 to receive the combustion gases. The combustion gases flow through the flow path 366 and out through the scroll outlet 364, which is fluidly coupled to the turbine 130.

Reference is again made to FIG. 3, which depicts the combustion assembly 140 in greater detail. In this example, the outer wall 310 and inner wall 320 of the housing 300 form a cooling plenum 380 that receives the compressed air from the load compressor 170 via duct 212. In particular, duct 212 is fluidly coupled to the cooling plenum 380 through a cooling inlet 382. The walls 310, 320 are arranged such that the cooling plenum 380 generally surrounds the combustor 142 and the scroll 144. In one example, the inner wall 320 may be considered the outer walls of the combustor 142 and the scroll 144 such that the cooling plenum 380 surrounds the outer walls of the combustor 142 and the scroll 144.

In this manner, the relatively low temperature air from the load compressor 170 within the cooling plenum 380 may remove heat from the combustor 142 and the scroll 144, thereby reducing the temperature of the combustor 142 and the scroll 144. The cooling plenum 480 may take any suitable size, shape, or configuration to deliver the cooling flow to the combustor 142 and/or combustor scroll 144. For example, the size, shape, or configuration may be optimized to produce a constant surface temperature on the combustor 142 and/or combustor scroll 144.

Upon flowing through the plenum 380, the air may exit the plenum 380 via outlet 384. The outlet 384 may be fluidly coupled to the exhaust duct 214. The exhaust duct 214 may direct the air overboard or into the exhaust path 206 of the gas generator section 110, as described above.

Since the air pressure of the load compressor 170 is higher than the pressure along the surface of the scroll 144 (or other portions of the gas generator section 110 to be cooled), the air from the load compressor 170 may have advantageous flow and pressure characteristics for cooling the combustion section and/or other sections of the gas generator section 110 and subsequently out through the exhaust path 206.

As schematically depicted in FIGS. 1 and 2, the controller 180 is operatively coupled to one or more of the APU components, such as the core compressor 120, the turbine 130, the combustion assembly 140, the gear arrangement 150, the starter generator 160, and the actuators 174 associated with the load compressor 170. The controller 180 may receive inputs or commands from a number of sources, including sensors associated with the APU 100, an operator interface (not shown), and/or other aircraft systems, valves, and/or actuators. Examples of sensors that may provide inputs to the controller 180 include speed sensors associated with the shaft 112, compressors 120, 170, and/or turbine 140; temperature sensors positioned throughout the gas generator section 110 and/or at the inlet or outlet of the load compressor 170; pressure sensors positioned throughout the gas generator section 110 and/or at the inlet or outlet of the load compressor 170; and/or condition based monitoring sensors such as vibration sensors or accelerometers.

The controller 180 may be coupled to the APU components, as well as to components or systems outside of the APU 100, via any suitable communications bus. Generally, based on inputs or commands, the controller 180 is configured to operate one or more of the components of the APU 100, and particularly, to carry out the functions described herein. In some embodiments, the controller 180 may part of a larger system that additionally controls other aircraft systems or components. As examples, the controller 180 may generate commands to actuate the IGVs 172 of the load compressor 170, to manage the flow of fuel to the combustor 142, and/or to couple or decouple the engagement of the gear arrangement 150 to various components. The commands from the controller 180 may be generated based on schedules associated with operating conditions. For example, the controller 180 may operate as part of a Full Authority Digital Engine Controller (FADEC) associated with the ECS or a main engine starting system (MES) that may include one or more operating schedules selected based on a respective mode to provide commands to the IGVs 172 and/or speed of the load compressor 170, as examples.

The controller 180 may be implemented in various manners, such as in software on a processor, on a programmable chip, on an Application Specific Integrated Chip (ASIC), or as a hardware circuit. In some embodiments, the controller 180 is implemented in hardware on a dedicated circuit board located inside a FADEC, an Electronic Engine Controller (EEC), or an Engine Control Unit (ECU). In other embodiments, the controller 180 may be is implemented in a digital processor. An example embodiment of a controller 180 may be in the form of a computing device having, among other things, a processing unit and a memory which has stored therein computer-executable instructions. The processing unit may include any suitable devices to implement functions described herein such that instructions, when executed by the computing device or other programmable apparatus, may cause the functions/acts/steps specified in the methods described herein to be executed. The processing unit may include, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof. The memory may include non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally, such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may include any storage means (e.g., devices) suitable for retrievably storing machine-readable instructions executable by processing unit. Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Regardless of how the controller 180 is specifically implemented, it may, in one example, operate the various APU components in one or more modes, as introduced above. The modes may include an idle mode, an electric power mode, an air mod, and a start mode (e.g., MES). In the idle mode, the APU 100 is operating but not providing air or electricity to other systems. In the electric power mode, the starter generator 160 of the APU 100 provides electricity to one or more aircraft systems on the ground or in flight. In the air mode, the load compressor 170 of the APU 100 provides compressed air for various loads (e.g., ECS) within the aircraft on the ground or in flight. In the start mode, the load compressor 170 provides compressed air to assist in starting the main engine.

During one or more (or any) of the above-mentioned modes, the controller 180 may, for example, control the positions of the IGVs 172 in the load compressor 170 to ensure sufficient compressed air is supplied to the above-mentioned pneumatic loads and to the above-mentioned cooling loads. More specifically, the load compressor 170 may be operated in a manner to provide the cooling air to the gas generator section 110 without sacrificing the other uses (e.g., the ECS or MES air). In particular, the IGVs 172 may have margins that enable additional air flow, thereby enabling relatively minor modification to existing operating schedules in order to deliver the cooling air to the cooling loads. In some instances, these increased flow schedules may provide a more optimized operation of the load compressor 170 and the overall APU 100. In one embodiment, the use of cooling air from the load compressor 170 eliminates any need to use core air for cooling the combustion assembly 140. This is particularly advantageous since, in some conventional arrangements, cooling the combustor scroll with air from the core compressor has been insufficient. For example, in some instances, the air flow from the load compressor 170 may be cooler than air exiting the core compressor 120. In addition to or as alternative to the combustion assembly 140, the cooling flow from the load compressor 170 may be used for other engine components. Additionally, since the air from the load compressor 170 may be directed down the shaft or ducted to provide cooling to the hot portions of the gas generator section 110, air from the core compressor 120 does not need to be utilized for cooling, thereby enabling the air from the core compressor to remain in the main flow path such that work may be extracted. This increased efficiency and power generation allows the load compressor 170 to draw more power from the gas generator section 110 to replace the cooling need. Analysis has shown that the power required by the load compressor 170 to supply cooling air flow is less than the power required by the core compressor 120.

Accordingly, the examples discussed above may provide a number of advantages. The embodiments discussed herein may improve the component life and operating life of the engine assembly. This is particularly applicable to the combustor scroll, which has a helical, asymmetrical nature that may otherwise be difficult to cool. In some examples, the load compressor may provide some or all of the can-combustor scroll cooling. As a result, little to no APU core compressor exit airflow may be necessary to cool the can-combustor scroll, thereby improving the overall efficiency and power density of the APU. During flight, cooling may be provided to the combustion section in the same manner as on the ground since the minimal flow available at high altitudes is sufficient to cool the higher temperatures on the hot side of the aircraft operational envelope. In some examples, the APU inlet and load compressor inlet maintain standard commercial aircraft installation practice with airflow from the opening at the aircraft skin (inlet opening, door, tailpipe inlet, etc.) to allow ram air into the engine.

It will be apparent to those skilled in the relevant arts from this specification that the examples disclosed herein can be used for purposes other than as onboard auxiliary power units for rotary and fixed wing aircraft. For example, they may be used in ground cart applications to provide ground power and environmental support. Embodiments discussed herein may find beneficial use in many industries and applications, including aerospace, automotive, and electricity generation, but particularly in high performance aircraft. The term "auxiliary power unit" as employed herein is to be understood as being employed as one of convenience; it is not intended to restrict the scope of the invention as defined in the appended claims.

In one embodiment, an engine system, includes a gas generator section and a load compressor. The gas generator section includes a core compressor, a combustion assembly, and a turbine. The core compressor is configured to receive and compress a first flow of air as first compressed air. The combustion assembly is fluidly coupled to receive the first compressed air from the compressor, mix the first compressed air with fuel, and combust the first compressed air and fuel mixture to result in combustion gases. The turbine is fluidly coupled to receive the combustion gases from the combustion assembly and is configured to extract energy from the combustion gases. The load compressor is configured to be driven by the turbine, and it is further configured to receive and compress a second flow of air as second compressed air. At least a portion of the second compressed air is directed to the gas generator section as cooling air.

These aspects and other embodiments may include one or more of the following features. The portion of the second compressed air may be directed to the combustion assembly as the cooling air. The combustion assembly may include a can combustor and a combustor scroll, and the portion of the second compressed air may be directed to cool at least one of the can combustor and the combustor scroll. The portion of the second compressed air may be directed to cool each of the can combustor and the combustor scroll. The combustion assembly may further include a housing formed by an inner wall and an outer wall such that a cooling plenum is formed between the inner wall and the outer wall, and the portion of the second compressed air may be directed into the cooling plenum. The turbine may be rotationally mounted via one or more air bearings, and the portion of the second compressed air may be directed to the one or more air bearings as cooling air. The portion of the second compressed air may be directed to the turbine as cooling air. A shaft may be coupled between at least the turbine and the core compressor, and a flow passage may be formed in the shaft and coupled to receive at least a portion of the second compressed air. The turbine may be rotationally mounted on the shaft via one or more air bearings, and the portion of the second compressed air received by the flow passage may be directed to the one or more air bearings as cooling air. The portion of the second compressed air received by the flow passage may be directed to the turbine as cooling air. The load compressor may include a plurality of inlet guide vanes configured to control the second flow of air into the load compressor. A controller may be coupled to the load compressor and configured to send commands to actuate the inlet guide vanes such that the load compressor provides the second compressed air. The gas generator section and the load compressor may form an auxiliary power unit (APU). One or more ducts may extend between the load compressor and the gas generator section to direct the second compressed air from the load compressor to the combustion assembly.

In another embodiment, an auxiliary power unit (APU) system includes a gas generator section and a load compressor. The gas generator section includes a core compressor, a combustion assembly, and a turbine. The core compressor is configured to receive and compress a first flow of air as first compressed air. The combustion assembly is fluidly coupled to receive the first compressed air from the compressor, mix the first compressed air with fuel, and combust the first compressed air and fuel mixture to result in combustion gases. The turbine is rotationally mounted via one or more air bearings. The turbine is fluidly coupled to receive the combustion gases from the combustion assembly and is configured to extract energy from the combustion gases. The load compressor is configured to be driven by the turbine, and it is further configured to receive and compress a second flow of air as second compressed air. At least a portion of the second compressed air is directed as cooling air to the combustion assembly, the one or more air bearings, and the turbine.

These aspects and other embodiments may include one or more of the following features. A shaft may be coupled between at least the turbine and the core compressor, and a flow passage may be formed in the shaft and coupled to receive at least a portion of the second compressed air. The portion of the second compressed air received by the flow passage may be directed to the one or more air bearings and to the turbine. The load compressor may include a plurality of inlet guide vanes configured to control the second flow of air into the load compressor, and a controller may be coupled to the load compressor and configured to send commands to actuate the inlet guide vanes such that the load compressor provides the second compressed air. One or more ducts may extend between the load compressor and the gas generator section to direct the second compressed air from the load compressor to the combustion assembly.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine system, comprising:
   a gas generator section comprising
      a core compressor configured to receive and compress a first flow of air as first compressed air;
      a combustion assembly fluidly coupled to receive the first compressed air from the compressor, mix the first compressed air with fuel, and combust the first compressed air and fuel mixture to result in combustion gases;
      a turbine fluidly coupled to receive the combustion gases from the combustion assembly and configured to extract energy from the combustion gases and exhaust the combustion gases via an exhaust path; and
   a load compressor configured to be driven by the turbine, the load compressor configured to receive and compress a second flow of air as second compressed air, wherein:
   the combustion assembly comprises a can combustor, a combustor scroll discharging the combustion gases to the turbine via a scroll outlet, and a housing,
   the can combustor and the combustor scroll are disposed within the housing,
   the housing includes an inner wall, an outer wall, a cooling plenum formed between the inner wall and the outer wall, a cooling inlet formed in the outer wall, and a cooling outlet formed in the outer wall, and
   at least a first portion of the second compressed air is directed as a first cooling air into the cooling plenum, via the cooling inlet, to deliver cooling flow around the can combustor and the combustor scroll, and all of the first cooling air that enters the cooling plenum through the cooling inlet is subsequently discharged from the cooling plenum, via the cooling outlet, into the exhaust path downstream of the turbine.

2. The engine system of claim 1, wherein:
   the turbine is rotationally mounted via one or more air bearings; and
   at least a second portion of the second compressed air is directed to the one or more air bearings as a second cooling air.

3. The engine system of claim 1, wherein at least a second portion of the second compressed air is directed to the turbine as a second cooling air.

4. The engine system of claim 1, further comprising:
   a shaft coupled between at least the turbine and the core compressor; and
   a flow passage formed in the shaft and coupled to receive at least a second portion of the second compressed air.

5. The engine system of claim 4, wherein:
   the turbine is rotationally mounted on the shaft via one or more air bearings; and
   the at least the second portion of the second compressed air received by the flow passage is directed to the one or more air bearings as a second cooling air.

6. The engine system of claim 4, wherein the at least the second portion of the second compressed air received by the flow passage is directed to the turbine as a second cooling air.

7. The engine system of claim 1, wherein the load compressor includes a plurality of inlet guide vanes configured to control the second flow of air into the load compressor.

8. The engine system of claim 7, further comprising a controller coupled to the load compressor and configured to send commands to actuate the plurality of inlet guide vanes such that the load compressor provides the second compressed air.

9. The engine system of claim 1, wherein the gas generator section and the load compressor form an auxiliary power unit (APU).

* * * * *